United States Patent [19]

Nahachewski

[11] Patent Number: 4,886,294
[45] Date of Patent: Dec. 12, 1989

[54] ANTI-TIP DEVICE FOR A VEHICLE

[76] Inventor: Vladimir W. Nahachewski, 1073 Mt. Baldur Drive, Vernon, British Columbia, V1B 2N8, Canada

[21] Appl. No.: 193,503

[22] Filed: May 12, 1988

[51] Int. Cl.[4] ............................................. B60R 21/00
[52] U.S. Cl. ..................................................... 280/755
[58] Field of Search ............... 280/755, 758, 767, 298, 280/47.2, 764.1, 293, 295; 188/5, 6; 212/189; 298/175 G

[56] References Cited

U.S. PATENT DOCUMENTS

| | | | |
|---|---|---|---|
| 1,492,467 | 4/1924 | Stokes | 280/755 |
| 1,609,797 | 12/1926 | Fat | 280/755 |
| 2,629,611 | 2/1953 | Covington | 280/292 |
| 3,310,181 | 3/1967 | Symmak | 280/764.1 |
| 4,515,392 | 5/1985 | Torras | 280/755 |
| 4,522,420 | 6/1985 | Hannappel | 280/769 |

FOREIGN PATENT DOCUMENTS 158735 4/1957 Sweden ............................ 280/755

Primary Examiner—Charles A. Marmor
Assistant Examiner—Richard Camby
Attorney, Agent, or Firm—Bull, Housser & Tupper

[57] ABSTRACT

The invention relates to an anti-tip device for a vehicle having a pair of rear wheels and a front wheel. The device includes a first member connectable to a rear of the vehicle. The device also includes a second member having a first end and a second end, the first end of the second member being pivotally connected to the first member for pivotting about a generally vertical axis when the vehicle is level so the second member extends rearwardly from the first member in a first position to prevent tipping of the vehicle and so the second member can be pivoted to a storage position generally perpendicular to the first position. The device may further include a hitch mechanism for connecting a trailer to the vehicle.

13 Claims, 3 Drawing Sheets

ANTI-TIP DEVICE FOR A VEHICLE

FIELD OF THE INVENTION

The invention relates to an anti-tip device for a vehicle, and in particular, to an anti-tip device for all terrain vehicles having a pair of rear wheels and a front wheel.

BACKGROUND OF THE INVENTION

All terrain vehicles, having one or two front wheels and a pair of rear wheels have become very popular. They enable the rider to negotiate a wide variety of terrains. However, there have been an increasing number of accidents involving serious injury to, and sometimes death of the rider. In particular, when the all terrain vehicle is in a ditch or is climbing a hill, it is possible that the front wheel or wheels will lift off the ground. In this event, the vehicle rides on the rear wheels and is somewhat unstable. The rider may be able to force the front wheel or wheels back onto the ground, thereby stabilizing the vehicle. If, on the other hand, the rider is sitting too far back on the vehicle, it is possible that the vehicle will tip over, thereby throwing the rider from the vehicle. The rider could suffer injury when he is thrown from the vehicle or, the vehicle may tip over and land on the rider.

U.S. Pat. No. 4,515,392 (Torras) discloses a slope mower having a tail plate which functions to limit the maximum amount of tipping of the mower. The Torras tail plate does not appear to have a pivotal connection so that a portion thereof can be swung out of the way.

U.S. Pat. No. 1,609,797 (Fat) discloses a device for preventing tractors from overturning. The device consists of a pair of parallel side bars which are attached at their forward ends to the rear axle housing. Each of the side bars terminates in a foot which is carried sufficiently near the ground for contact therewith to prevent overturning of the tractor.

U.S. Pat. No. 4,522,420 (Hannappel) discloses an all terrain vehicle conversion system. The Hannappel vehicle includes a pair of anti-tip wheels at the back end thereof.

Other patents of general interest are U.S. Pat. No. 2,629,611 (Covington) and U.S. Pat. No. 4,412,595 (Kinzel).

The device as described in the prior art would appear to require several components, they appear to be rather bulky and they could be rather costly to adapt to an existing all terrain vehicle. These problems are overcome with the invention described herein.

The present invention comprises an anti-tip device for a vehicle having a pair of rear wheels and at least one front wheel. The anti-tip device includes a first member having provisions for connecting the device to a rear of the vehicle. The device further includes a second member having a first end and second end. The first end is pivotally connected to the first member for pivoting about a generally vertical axis when the vehicle is level. The second member extends rearwardly from the first member in a first position, to prevent tipping of the vehicle. The second member can be pivotted to a storage position generally perpendicular to the first position.

DESCRIPTION OF THE PREFERRED EMBODIMENT

Figure 1:
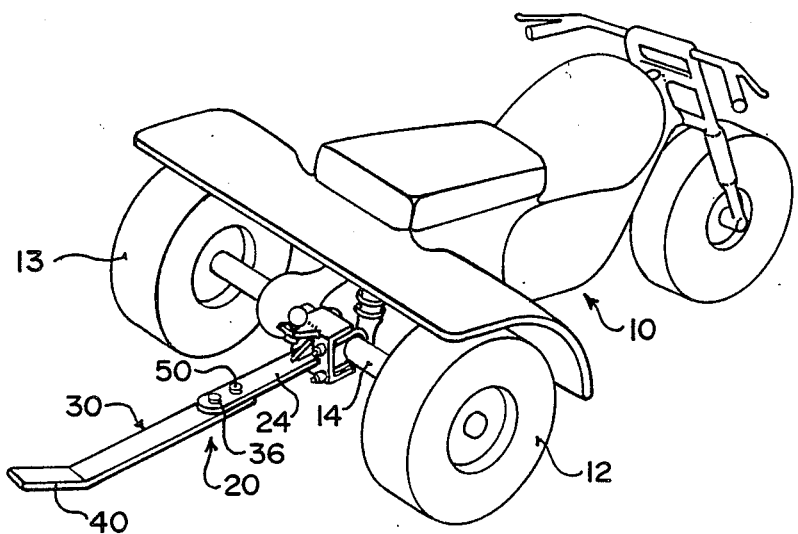
FIG. 1 is a perspective view showing the rear wheels of a vehicle, the rear wheels having an axle housing therebetween, an anti-tip device of the present invention being connected to the axle housing.

FIG. 1 shows a vehicle generally designated as 10. The vehicle 10 is of a sort generally referred to as an "all terrain vehicle". The vehicle 10 has a pair of right and left rear wheels 12 and 13 respectively and one front wheel or two (not shown). The rear wheels 12 and 13 have an axle therebetween and the axle is enclosed within an axle housing 14.

Figure 2:
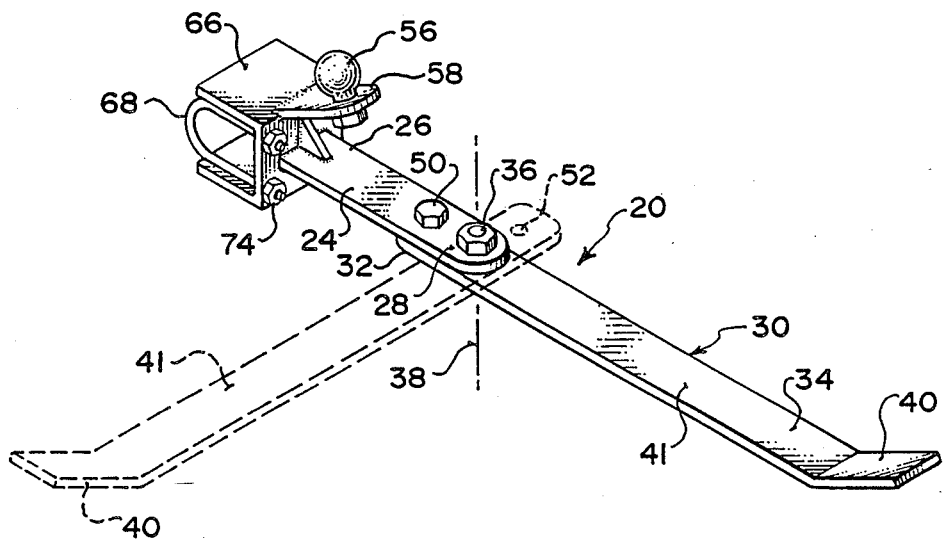
FIG. 2 is a perspective view of the anti-tip device of FIG. 1, showing a second member in a first position and showing the second member in a storage position in ghost.

An anti-tip device is generally designated as 20. As shown in FIGS. 1 and 2, the device 20 includes a first member 24 having an inner end 26 and an outer end 28. The device 20 also includes a second member 30 having a first end 32 and a second end 34. The second member 30 is pivotally connected to the first member 24 by a pivot pin 36 for pivotting about a generally vertical axis 38. The second member 30 has a rearward portion 40 which is inclined upwardly in use. The rearward portion 40 is at an angle slightly less than 45° with respect to forward portion 41 of the second member 30 in this preferred embodiment.

FIG. 2 shows in solid lines the second member 30 in a first position so the second member 30 is aligned with member 24 and extends rearwardly from the first member 24 to prevent tipping of the vehicle 10. FIG. 2 also shows, in ghost, the second member 30 in a storage position generally perpendicular to the first position.

The device 20 includes a lock means for locking the second member 30 in the first position. The lock means includes a anchor bolt 50 on the first member 24 and an aperture 52, alignable with the anchor bolt 50, adjacent the first end 32 of the second member 30. Of course, the anchor bolt 50 could be on the second member 30 and the aperture 52 could be on the first member 24. Various other locking means could also be used.

The device 20 may also include a hitch for connecting a trailer to the vehicle. The hitch in this case includes a conventional ball joint 56. A conventional socket on a trailer (not shown) receives the ball joint 56. As shown in FIG. 2, the ball joint 56 is connected to a plate 58 which is in turn connected to a C-shaped bracket 66.

Figure 3:
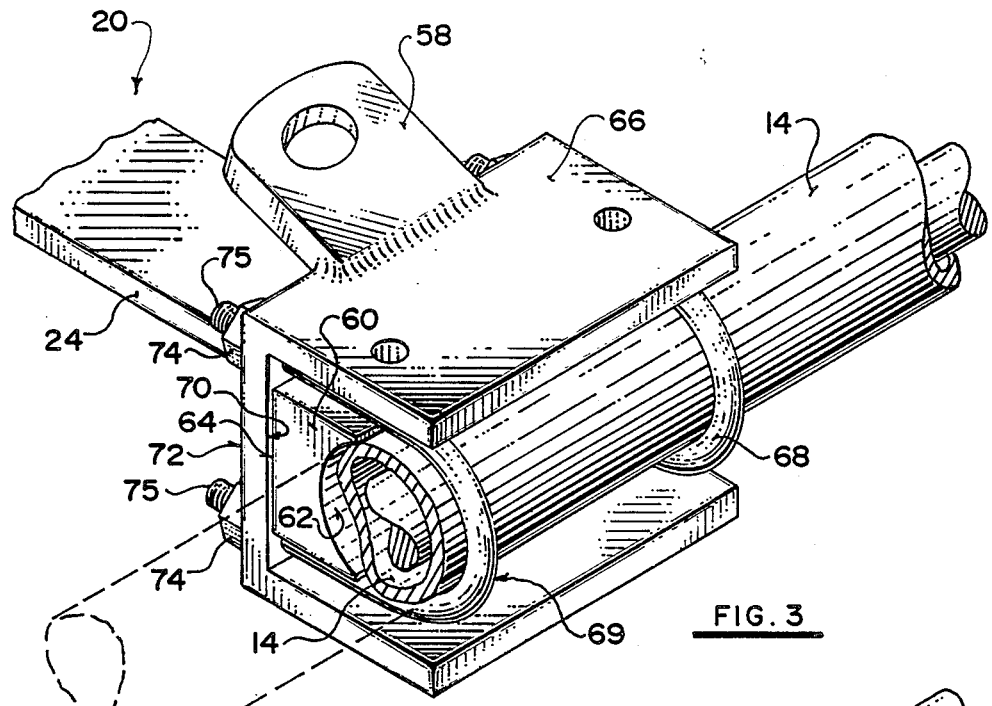
FIG. 3 is a perspective view of the axle housing of the vehicle, the axle housing having a bracket connected thereto and also showing a first embodiment of a means for connecting the anti-tip device to the axle housing.

The device 20 includes means for connecting the device to the axle housing 14. FIG. 3 shows the first embodiment of the means for connecting. In this embodiment, there is a bracket 60 connected to the axle housing 14. The bracket 60 is an optional feature for some vehicles 10. The bracket 60 has a semi-circular portion 62 which is connected to the axle housing 14 and a flat vertical portion 64. The bracket 60 is connected to the axle housing 14 by any suitable means such as a conventional weld. The means for connecting, in this embodiment includes a C-shaped bracket 66 and a pair of U-bolts 68 and 69. The C-shaped bracket 66 has a flat, inner surface 70 and a flat, outer surface 72, both being vertical in use. The C-shaped bracket 66 includes four openings therein. The device 20 is connected to the flat vertical outer surface 72 by conventional means such as a welds as in the embodiment. The ends of the U-bolts 68 and 69 are threaded, as shown at 75. The device 20 is connected to the axle housing 14 by placing the flat vertical inner surface 70 of the C-shaped bracket 66 against the flat, vertical portion 64 of the bracket 60 and thereafter inserting the U-bolts 68 and 69 through the openings and securing nuts 74 to the bolts 68 and 69.

Figure 4:
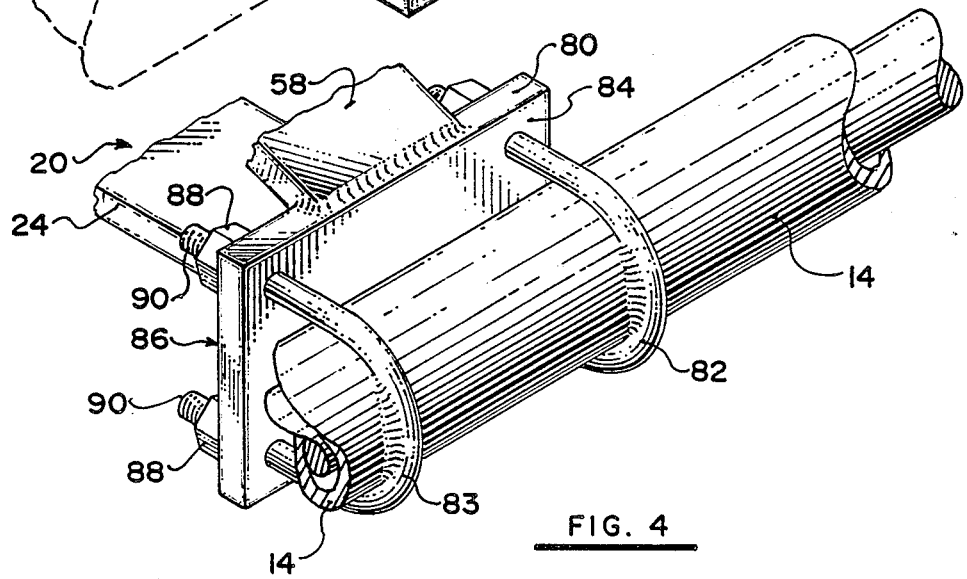
FIG. 4 is a perspective view of the axle housing of FIG. 3 and showing a second embodiment of the means for connecting the anti-tip device to the axle housing.

FIG. 4 shows an alternate embodiment of the means for connecting. This embodiment is for use when the axle housing 14 does not include the bracket 60 connected thereto. In this embodiment, the means for connecting includes a flat rectangular plate 80 and a pair of U-bolts members 82 and 83. The ends of the U-bolts 82 and 83 are threaded, as shown at 90. The U-bolts are welded to the axle housing and are thereby secured in place. The flat rectangular plate 80 has an inner side 84 and an outer side 86. The device 20 and the plate 58 are connected to the outer side 86 by welds in this embodiment or other conventional means. The flat rectangular plate 80 has four openings therein to receive the ends of the U-bolts. To connect the device 20 to the axle housing 14, the inner side 84 of the flat rectangular plate 80 is placed adjacent the axle housing 14 and the ends of the U-bolts are passed through the openings in the flat rectangular plate 80 so that a plurality of nuts 88 can be employed to secure the U-shaped members in place.

Figure 5:
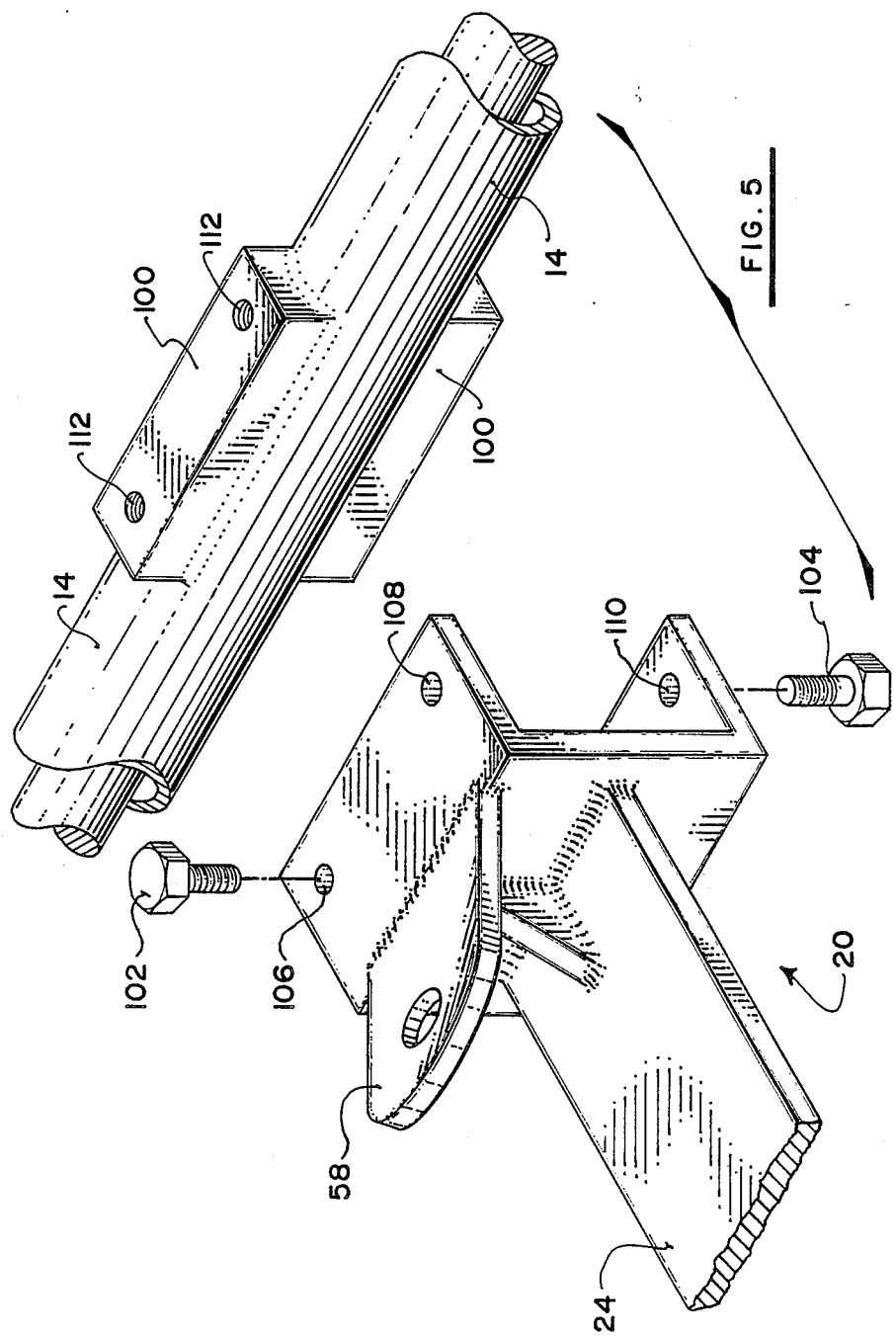
FIG. 5 is a perspective view of the axle housing of FIG. 3 and showing a third embodiment of the means for connecting the anti-tip device to the vehicle.

Referring to FIG. 5, yet another alternative embodiment of the means for connecting the device to the axle housing is shown. In this embodiment, the vehicle is of a type having a factory provided ball hitch bracket 100, previously installed on the rear axle housing 14. The device 20 is connected to the hitch bracket by fastening two top bolts 102 (only one of which is shown) and two bottom bolts 104 (only one of which is shown) through top holes 106 and 108 and bottom holes 110 (only one of which is shown) respectively. The factory hitch bracket has tapped holes 112 for receiving the top and bottom bolts respectively. The device 20 is thus secured to the hitch bracket.

OPERATION

When a person is riding the vehicle 10, the second member 30 is locked in the first position, shown in solid lines in FIG. 2, extending rearwardly from the first member 24. In this manner, the vehicle 10 is prevented from tipping over and perhaps causing serious injury or death to the person. The rearward portion 40 of the second member 30 is inclined upwardly so that it will not drag along the ground when the vehicle 10 is in use.

If the person wishes to connect a trailer to the vehicle 10, the member 30 is pivoted to the storage position, shown in ghost in FIG. 2, so that the ball joint 56 can be engaged with the socket on the trailer. The member 30 can also be pivoted to the storage position when the vehicle 10 is not in use.

It is to be understood that the invention is not confined to the particular construction and arrangement of parts as herein illustrated and described, but embraces all such modified forms thereof as come within the scope of the following claims.

What is claimed is:

1. An anti-tip device for a vehicle having a pair of rear wheels and at least one front wheel, the device comprising:
  (a) a first member having means for connecting the device to the rear of the vehicle, a hitch means being connected to the means for connecting, for connecting a trailer to the vehicle; and
  (b) a second member having a first end and a second end, the first end of the second member being pivotally connected to the first member for pivotting about a generally vertical axis when the vehicle is level so the second member extends rearwardly from the first member in a first position to prevent tipping of the vehicle and so the second member can be pivotted to a storage position generally perpendicular to the first position.

2. An anti-tip device for a vehicle having a pair of rear wheels with an axle housing therebetween and at least one front wheel, the device comprising:
  (a) a first member having means for connecting the device to the axle housing of the vehicle;
  (b) a second member having a first end and a second end, the first end of the second member being pivotally connected to the first member for pivotting about a generally vertical axis when the vehicle is level so the second member extends rearwardly from the first member in a first position to prevent tipping of the vehicle and so the second member can be pivotted to a storage position generally perpendicular to the first position.

3. An anti-tip device for a vehicle having a pair of rear wheels and at least one front wheel, the device comprising:
  (a) a first member having means for connecting the device to the rear of the vehicle; and
  (b) a second member having a first end and a second end, the second member being inclined upwardly, generally adjacent the second end such that a rearward portion of the second end is inclined upwardly in use, the first end of the second member being pivotally connected to the first member for pivotting about a generally vertical axis when the vehicle is level so the second member extends rearwardly from the first member in a first position to prevent tipping of the vehicle and so the second member can be pivotted to a storage position generally perpendicular to the first position.

4. A combination of:
  (a) a vehicle having a pair of rear wheels and at least one front wheel; and
  (b) an anti-tip device for a vehicle, the device comprising a first member having connecting means for connecting the device to the rear of the vehicle, a hitch connected to the connecting means for connecting a trailer to the vehicle, and a second member having a first end and a second end, the first end being pivotally connected to the first member for pivotting about a generally vertical axis when the vehicle is level so the second member extends rearwardly from the first member in a first position to prevent tipping of the vehicle and so the second member can be pivotted to a storage position generally perpendicular to the first position.

5. A combination of:
  (a) a vehicle having a pair of rear wheels and at least one front wheel; and (b) an anti-tip device for the vehicle, the device comprising a first member having means for connecting the device to the rear of the vehicle, and a second member having a forward portion and a rearward portion, the rearward portion being inclined upwardly generally 45 degrees with respect to the forward portion, the second member having a first end and a second end, the first end being pivotally connected to the first member for pivotting about a generally vertical axis when the vehicle is level so the second member extends rearwardly from the first member in a first position to prevent tipping of the vehicle and so the second member can be pivoted to a storage position generally perpendicular to the first position.

6. An anti-tip device as claimed in claim 2, wherein the means for connecting includes a pair of U-shaped members.

7. An anti-tip device as claimed in claim 3, wherein the rearward portion is at an angle slightly less than 45° with respect to a forward portion of the second member.

8. An anti-tip device for a vehicle having a pair of rear wheels and at least one front wheel, the rear wheels having an axle therebetween with an axle housing, the device comprising:
 (a) a first member having an inner end and an outer end, the first member also having means for connecting the device to the axle housing;
 (b) a second member having a first end and a second end, the first end of the second member being pivotally connected to the outer end of the first member for pivotting about a generally vertical axis when the vehicle is level, so the second member extends rearwardly from the first member in a first position to prevent tipping of the vehicle and so the second member can be pivotted to a storage position generally perpendicular to the first position; and
 (c) hitch means, connected to the means for connecting, for connecting a trailer to the vehicle.

9. An anti-tip device as claimed in claim 8, further including lock means for locking the second member in the first position, the lock means including a retractable member.

10. An anti-tip device as claimed in claim 8, wherein the means for connecting includes a pair of U-shaped members.

11. An anti-tip device as claimed in claim 8, wherein the hitch means includes a ball joint connected to the means for connecting and a socket, for receiving the ball joint, connected to the trailer.

12. An anti-tip device as claimed in claim 8, wherein the second member is inclined upwardly generally adjacent the second end such that a rearward portion thereof is inclined upwardly in use.

13. An anti-tip device as claimed in claim 12, wherein the rearward portion is at an angle slightly less than 45° with respect to a forward portion of the second member.

* * * * *